United States Patent
Li et al.

(10) Patent No.: US 11,796,295 B2
(45) Date of Patent: Oct. 24, 2023

(54) FULL-AUTOMATIC WHEEL HUB THREE-DIMENSIONAL SCANNING SYSTEM FOR INTELLIGENT PRODUCTION LINES OF AUTOMOTIVE WHEEL HUB

(71) Applicants: QINGDAO UNIVERSITY OF TECHNOLOGY, Shandong (CN); UNIVERSITY OF SHARJAH, Sharjah (AE)

(72) Inventors: Changhe Li, Qingdao (CN); Dewei Liu, Qingdao (CN); Zongming Zhou, Qingdao (CN); Wenfeng Ding, Qingdao (CN); Yanbin Zhang, Qingdao (CN); Zafar Said, Sharjah (AE); Xiaoming Wang, Qingdao (CN); Min Yang, Qingdao (CN); Bo Liu, Qingdao (CN); Xin Cui, Qingdao (CN); Mingzheng Liu, Qingdao (CN); Teng Gao, Qingdao (CN)

(73) Assignees: QINGDAO UNIVERSITY OF TECHNOLOGY, Qingdao (CN); UNIVERSITY OF SHARJAH, Sharjah (AE)

( * ) Notice: Subject to any disclaimer, the term of this patent is extended or adjusted under 35 U.S.C. 154(b) by 8 days.

(21) Appl. No.: 17/829,666

(22) Filed: Jun. 1, 2022

(65) Prior Publication Data
US 2023/0034799 A1 Feb. 2, 2023

(30) Foreign Application Priority Data
Jul. 29, 2021 (CN) .......................... 202110863089.4

(51) Int. Cl.
*G01B 5/00* (2006.01)
*G01B 11/24* (2006.01)

(52) U.S. Cl.
CPC ........ *G01B 5/0004* (2013.01); *G01B 11/2408* (2013.01); *G01B 5/0025* (2013.01)

(58) Field of Classification Search
CPC .......... G01B 5/00; G01B 11/27; G01B 11/24; F16C 13/00
(Continued)

(56) References Cited

U.S. PATENT DOCUMENTS 7,784,191 B2 * 8/2010 Knopik ................. G01B 5/255
33/203.18

FOREIGN PATENT DOCUMENTS

| CN | 109781027 A | 5/2019 |
| CN | 110375666 A | 10/2019 |

* cited by examiner

*Primary Examiner* — Que Tan Le
(74) *Attorney, Agent, or Firm* — Oliff PLC

(57) ABSTRACT

Provided a full-automatic wheel hub 3D scanning system for intelligent production line of automotive wheel hubs, comprising: a base plate is provided with an X-directional displacement control device and a Y-directional displacement control device; a roller-table assembly is arranged on the base plate and comprises a roller table, wherein the roller table is provided with an opposite-type photoelectric sensors and a wheel hub centring positioning device for centring positioning a wheel hub; a 3D scanning device, comprising a mounting bracket, wherein the bottom of the mounting bracket is controlled by the Y-directional displacement control device; a 3D scanner is mounted on the mounting bracket; a wheel hub scanning platform is arranged at an end of the roller-table assembly and is controlled by the X-directional displacement control device; and a robot is arranged on a first side of the wheel hub scanning platform, for conveying the wheel hubs after 3D scanning.

8 Claims, 13 Drawing Sheets

(58) Field of Classification Search
USPC .................................................. 250/221, 239
See application file for complete search history.

FULL-AUTOMATIC WHEEL HUB THREE-DIMENSIONAL SCANNING SYSTEM FOR INTELLIGENT PRODUCTION LINES OF AUTOMOTIVE WHEEL HUB

CROSS-REFERENCES TO RELATED APPLICATIONS

This application claims priority benefits to Chinese Patent Application No. 202110863089.4, filed 29 Jul. 2021, the contents of which are incorporated herein by reference.

TECHNICAL FIELD

The present invention relates to the technical field of mechanical processing equipment, and specifically to a full-automatic wheel hub three-dimensional (3D) scanning system for intelligent production lines of automotive wheel hubs.

BACKGROUND

Wheel hubs are important parts of automobiles, and molding processes thereof are diverse. In the automotive aluminum alloy wheel hub forming production line, the wheel hub model needs to be identified and the corresponding processing program needs to be written before the blank enters the processing machine tool, and the traditional method is manual operation by workers; therefore, it is the current trend of industrial development to free workers from heavy physical labor and realize the intelligence and automation of wheel hub forming.

Reverse engineering, for existing product prototypes, refers to the synthesis of a series of analysis methods, means and technologies for mining all aspects of product design, manufacturing and management involved in the product prototypes, and digesting and absorbing them. Reverse engineering can realize the modeling of different types of wheel hubs, automatically calculate their optimal machining routes and generate machining programs. Therefore, reverse engineering technology has a broad development prospect and great research significance in automating wheel hub processing. The measurement process of the original product is especially critical in reverse engineering, which mainly includes manual measurement by traditional gauges, CMM measurement and 3D scanner measurement, etc. But the traditional gauges manual measurement method has a large human error, and it is difficult to achieve the measurement of complex surfaces; while the CMM is a contact measurement method, although the measurement accuracy is high, but is limited by structure thereof, the parts that cannot be touched by the measurement head cannot be measured, there are greater limitations. The 3D laser scanning technology is a non-contact measurement method, which has the advantages of fast acquisition speed, high acquisition accuracy and unrestricted acquisition space, etc. Therefore, the 3D scanning technology is of great significance for automating the processing design of wheel hubs, liberating manpower and improving production efficiency.

Chinese patent application CN201910145102.5 provided a 3D scanning device. According to the patent, a scanner is mounted on a rotating platform, so that the 3D scanner rotates relative to a workpiece to be scanned; however, the radius on the rotating platform is fixed, so that the radial distance between the 3D scanner and the workpiece to be scanned cannot be adjusted, and the scanning platform cannot locate the position the workpiece to be scanned, thus seriously affecting the scanning accuracy of the 3D scanner. If it is applied to the intelligent production line of automotive wheel hubs, it will seriously affect the machining accuracy of the wheels.

Chinese patent application CN201910514988.6 provided a 3D scanner auxiliary tool and 3D scanning device, wherein the device enables the 3D scanner to rotate and scan around a workpiece. However, the device cannot adjust the radial distance of the 3D scanner relative to the workpiece to be scanned, and the device can only enable the 3D scanner to scan horizontally on the a plane, and cannot adjust the elevation angle of the 3D scanner, so that the scan data acquisition is insufficient, and the construction of the 3D model is affected.

In summary, the existing technology still needs manpower to carry the object to be scanned to the scanning platform, the degree of automation is not high, and the manpower is consumed; and the position of the object to be scanned on the scanning platform cannot be positioned, the scanning platform lacks positioning device and clamping device, so the object to be scanned in the scanning process is easy to change the position, which seriously affects the scanning accuracy; the requirement on the size of the scanned object has certain limitation, and the scanned objects with different sizes cannot be automatically adjusted; and the size of the car wheel hub is diverse, of which the requirements for the flexibility and adaptability of the scanning device are high; the degrees of freedom of the 3D scanner are low, so the focal distance between the scanner and the workpiece to be scanned cannot be adjusted according to the size of the workpiece to be scanned; furthermore, the existing technology is not suitable for production line production mode, which cannot automatically pick up the parts, assembling and clamping. Therefore, the existing invention technology cannot be applied to the efficient, precise and automatic automotive wheel hub intelligent production line, and it is urgent to design a high-precision wheel hub 3D scanning device with reasonable structure, automatic part pickup, automatic clamping and automatic scanning.

SUMMARY

For the shortcomings of the prior arts, the present invention provides a full-automatic wheel hub 3D scanning system for intelligent production lines of automotive wheel hubs, which can realize a high degree of automation, free workers from the production process, reduce the labor intensity of workers and improve production efficiency.

In order to achieve the above purpose, the present invention is realized by the following technical solutions.

Accordingly, provided a full-automatic wheel hub 3D scanning system for intelligent production line of automotive wheel hubs, comprising:

a base plate is provided with an X-directional displacement control device and a Y-directional displacement control device;

a roller-table assembly is arranged on the base plate and comprises a roller table, wherein the roller table is provided with an opposite-type photoelectric sensors and a wheel hub centring positioning device for centring positioning a wheel hub;

a 3D scanning device, comprising a mounting bracket, wherein the bottom of the mounting bracket is controlled by the Y-directional displacement control device; a 3D scanner is mounted on the mounting bracket;

a wheel hub scanning platform is arranged at an end of the roller-table assembly and being controlled by the X-directional displacement control device;

a robot is arranged on a first side of the wheel hub scanning platform, for conveying the wheel hubs after 3D scanning.

Further, the roller table is a pass-through roller table with a roller table window at an end of the roller table, an installation of the roller table can make a center of the roller table window to be located above a rectangular slot along the X-axis, and the opposite-type photoelectric sensors are mounted at a beginning and an end of the roller table window for detecting whether the wheel hub has reached a designated position, and thereby to control an operation of the wheel hub centring positioning device and the wheel hub scanning platform for picking up the part, respectively.

Further, the wheel hub centring positioning device is arranged below rollers of the roller table, and a crank sliding block mechanism is driven by an air cylinder, and a bracket with V-shaped wheels is arranged on a sliding table. The bracket shall pass through the gap between the adjacent rollers and the V-shaped wheels shall be used to push a wheel rim portion of the wheel hub to make the wheel hub in the middle of the roller table, so as to prevent the wheel hub from falling off while passing through the roller table.

Further, the wheel hub scanning platform comprises a lifting platform, a turntable is arranged on the lifting platform, a wheel clamping device and a sensor for detecting the presence of the wheel hub on the platform are arranged in the center of the turntable. Further, the turntable is connected with the lifting platform through a transmission assembly.

Further, the wheel hub clamping device for clamping the wheel hub comprises an air cylinder, a supporting block, a mounting plate, an inner brace claw assembly and a first connecting rod. The supporting block is mounted on the mounting plate, the mounting plate is connected with a piston rod of the air cylinder by threads, a mounting seat is arranged on the mounting plate and is used for being connected with a first end of the first connecting rod, and a second end of the first connecting rod is connected with the inner brace claw assembly, the inner brace claw assembly is connected with a mounting seat on the body of the air cylinder. The wheel clamping device is the crank sliding block mechanism driven by the air cylinder, the air cylinder retracting the inner brace claw assembly to support the wheel hub to tighten from inside, and the clamping of the wheel hub is completed.

Further, the inner brace claw assembly comprises a second linkage, a mounting block, a ball head and a hemispherical head. The second linkage is mounted in a rod groove of the mounting block, the ball head is mounted in a ball groove of the mounting block, and the ball head is connected to the hemispherical head by threads. The hemispherical head can rotate at a certain angle by a spherical side pair, so that the hemispherical head can adapt to curved surfaces of the wheel hubs with different sizes, which makes the adaptability of the wheel clamping device higher.

Further, the middle of the turntable for controlling the wheel hub rotation is provided with a square slot for mounting the air cylinder of the wheel hub clamping device, the air cylinder is mounted in the square slot in an embedded manner, a circular inner slot is mounted in the square slot, a spoke weighing sensor is provided in the circular inner slot, the air cylinder is connected with the spoke weighing sensor; the spoke weighing sensor can be used to monitor whether the wheel hub clamping device clamps wheel hub or not and thus control the operation of a displacement control module.

The turntable is additionally provided with a gas circuit channel, and the gas line can be connected into the air cylinder from the inside of the turntable.

A working process of the full-automatic wheel hub 3D scanning system for the intelligent production line of automotive wheel hubs is as follows:

When a wheel hub is transported to a position of opposite-type photoelectric sensors on a roller table, the opposite-type photoelectric sensors send a signal to a computer, which in turn controls a wheel hub centring positioning device to work, so as to ensure that the wheel hub is located in a middle of the roller table. At the same time, a diameter of the wheel hub can be obtained by the computer analyzing and calculating the signal sent by the sensors, and when the wheel hub is transported to a window of the roller table, the opposite-type photoelectric sensors send the signal to the computer, which in turn controls a motor of the roller table to stop, and the wheel hub stops at the window of the roller table, waiting to be taken.

After the motor of the roller table stops, the computer controls an operation of a ball screw mechanism mounted along the X-axis on a displacement control module, and a wheel hub scanning platform mounted on a sliding table of the ball screw mechanism is transported to a position directly below the wheel hub, then a lifting platform is raised, a piston rod of an air cylinder of a wheel clamping device is extended, and the wheel hub is pushed off the roller table. At this point, a spoke weighing sensor detects that the wheel hub has been lifted and sends a signal to the computer.

The computer receives the signal from the spoke weighing sensor that the wheel hub has been picked up and controls the ball screw mechanism mounted along the X-axis on the displacement control module to transport the wheel hub scanning platform to a front of a 3D scanner.

After the wheel hub scanning platform reaches the position, the wheel hub clamping device clamps the wheel hub and the lifting platform is reset. After a certain time, the turntable starts to rotate.

After the turntable rotates, the 3D scanner starts to work, and the computer further controls the displacement control module and the ball screw mechanism of the 3D scanning device according to whether the obtained data is clear, and a steering gear of the 3D scanning device in turn controls a focus distance between the wheel hub and the 3D scanner. After the scanning is completed, the computer processes the scanned data and automatically designs an optimal machining path according to the obtained 3D model and automatically writes and saves the machining program, so that if the next wheel hub is of the same model as the previous wheel hub, the machining program can be used directly.

A robot takes the wheel hub away from the wheel clamping device and the whole 3D scanning device enters the next working cycle.

The beneficial effects of the present invention are as follows:

(1) The present invention provided a 3D scanning system for automotive wheel hubs is highly automated and does not require workers to distinguish between various models of wheel hubs, and does not require manual writing of machining programs; workers only need to monitor the computer, which greatly liberates manpower and improves production efficiency.

(2) The present invention provided the 3D scanning system for automotive wheel hubs can make the wheel hub completely fixed on the scanning platform and will not produce position changes during the scanning process to affect the scanning accuracy.

(3) The present invention provided the 3D scanning system for automobile wheel hubs can adapt to most sizes of the automobile wheel hubs, which is more adaptable and flexible.

(4) The present invention provided the 3D scanning system for automobile wheel hubs can keep workers away from the processing equipment and improve the safety of the operating environment for workers.

(5) The present invention provided the 3D scanning system for automobile wheel hubs has a lower cost and a compact structure with high space utilization.

Wherein, roller table assembly I, displacement control module II, 3D scanning device III, wheel hub scanning platform IV, and robot V;
wheel hub centring positioning device I-1, flange seat I-2, roller table I-3, wheel hub I-4, opposite-type photoelectric sensor I-5, opposite-type photoelectric sensor I-6;
V-shaped wheels with screw I-1-1, bracket I-1-2, sliding table I-1-3, base I-1-4, air cylinder I-1-5, connecting rod I-1-6, connecting rod I-1-7;
base plate II-1, first ball screw assembly II-2, second ball screw assembly II-3;
motor III-1, motor supporting base III-2, ball screw upper mounting seating seat III-16, sliding table III-5, 3D scanner mounting bracket III-6, 3D scanner III-9, steering gear III-14, guide bar III-10, ball screw III-13, outer spherical ball bearing with seat III-12, ball screw mounting seat III-11, working table III-15, flange III-3, hexagonal flange face nut III-4, steering gear arm III-7, screw III-8, coupling III-17;
wheel hub clamping device IV-1, turntable IV-2, lifting platform IV-3, working table IV-4, transmission assembly IV-5, spoke weighing sensor IV-6;
supporting block IV-1-1, mounting plate IV-1-2, inner brace claw assembly IV-1-3, air cylinder IV-1-4, connecting rod IV-1-5;
connecting rod IV-1-3-1, mounting block IV-1-3-2, hemispherical head IV-1-3-4, ball head IV-1-3-3, screw IV-1-3-5;
end surface of center circle of inner spoke of the wheel hub I-4-1, surface of inner circle I-4-2;
gear IV-5-1, bushing IV-5-2, transmission shaft IV-5-3, outer spherical ball bearing with seat IV-5-4, worm gear IV-5-5, motor case IV-5-6, motor IV-5-7, worm shaft IV-5-9, coupling IV-5-8, outer gear slewing bearing IV-5-12, motor case cover IV-5-11, outer spherical ball bearing with seat IV-5-10;
bearing seat IV-3-1, supporting rod IV-3-2, connecting rod IV-3-3, air cylinder IV-3-4, guide rail IV-3-6, sliding block IV-3-7, mounting base IV-3-5.

DETAILED DESCRIPTION

Figure 1:
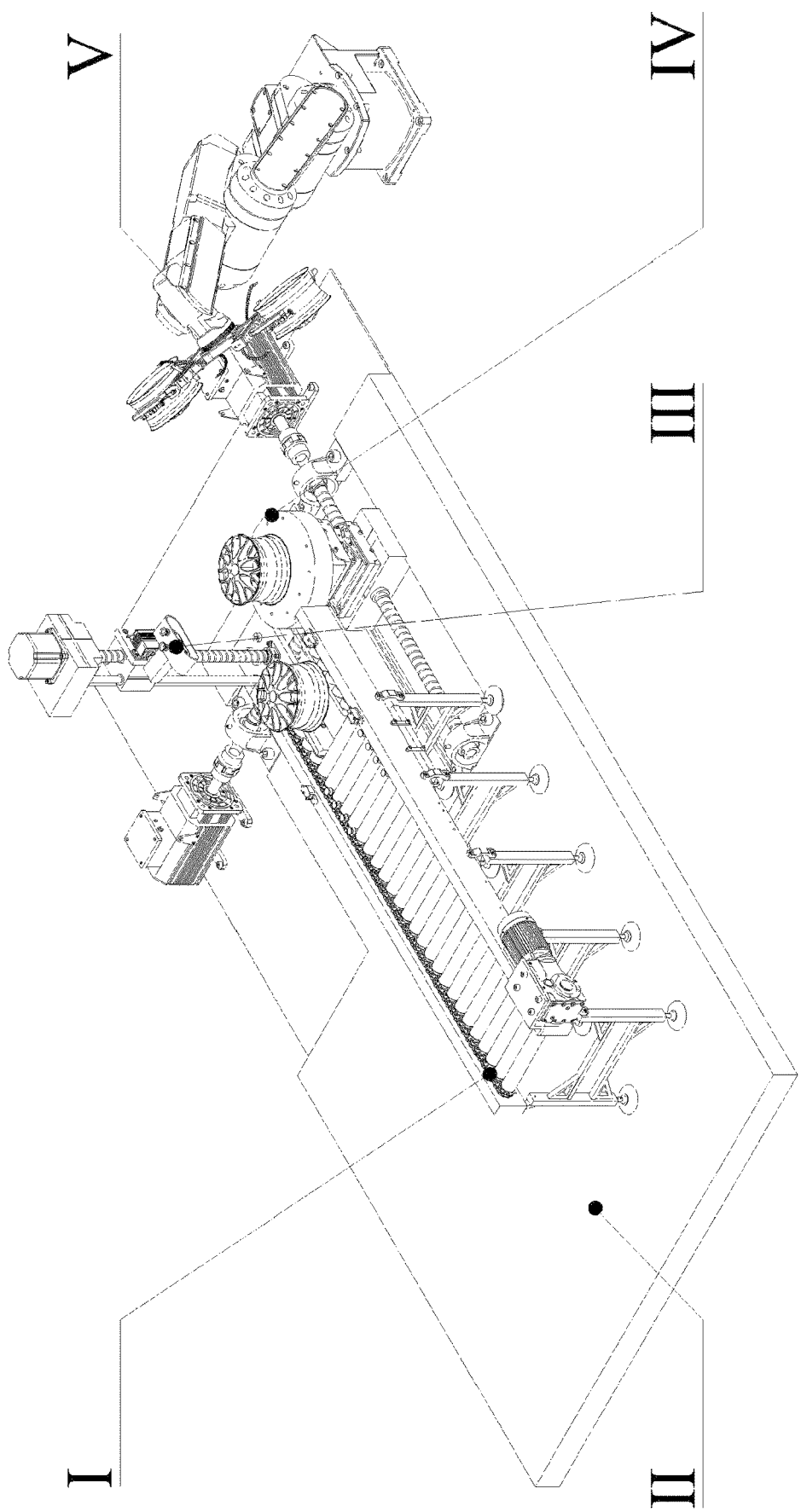
FIG. 1 is an axonometric view of a full-automatic wheel hub 3D scanning system.
Figure 2:
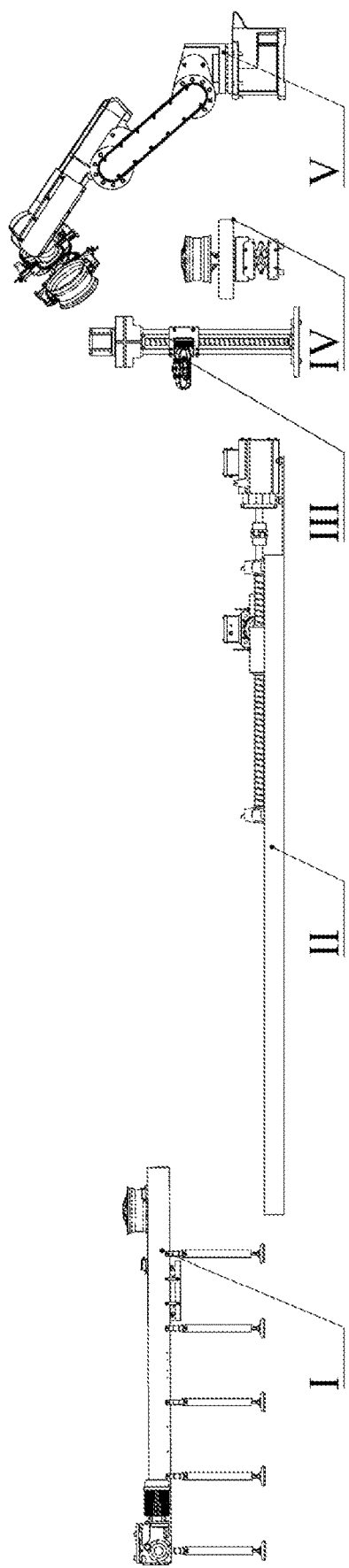
FIG. 2 is an exploded view of the full-automatic wheel hub 3D scanning system.

An exemplary embodiment of the present invention, as shown in FIGS. 1 and 2, accordingly, provided a (fully) automatic 3D scanning system for automotive wheel hubs, comprising a roller table assembly I, a displacement control module II, a 3D scanning device III, a wheel hub scanning platform IV and a robot V. The power parts in each mechanism are separately connected to a computer. Wherein, the roller table assembly body I is placed on the displacement control module II, and the 3D scanning device III and the wheel hub scanning platform IV are respectively set on a first ball screw assembly II-2 in the displacement control module II, wherein the 3D scanning device III can be moved along the Y-axis direction by a second ball screw assembly II-3, so as to change a focal distance between the 3D scanning device III and a wheel hub I-4. The wheel hub scanning platform IV can be moved along the X-axis direction by the first ball screw assembly II-2, which can move to a position below a window of a roller table I-3 and after carrying the wheel hub I-4, move to a front of the 3D scanning device III. The robot V placed next to the displacement control module II can transport the wheel hub I-4 to a processing machine after scanning work of the 3D scanning system is completed.

Specifically, the roller table assembly I being responsible for transporting the wheel hub to a designated position; the transmission assembly II being responsible for movement of the 3D scanning device III in the Y-axis direction and movement of the wheel hub scanning platform IV in the X-axis direction; the 3D scanning device III being responsible for a 3D scanning of the wheel hub I-4 and constructing a 3D model; the wheel hub scanning platform IV being responsible for transporting the wheel hub I-4 from the roller table assembly I to a designated position, clamping the wheel hub I-4 and making the wheel hub I-4 rotate on the device; the robot V being responsible for transporting the wheel hub I-4 to a horizontal lathe after the 3D scanning.

Figure 3:
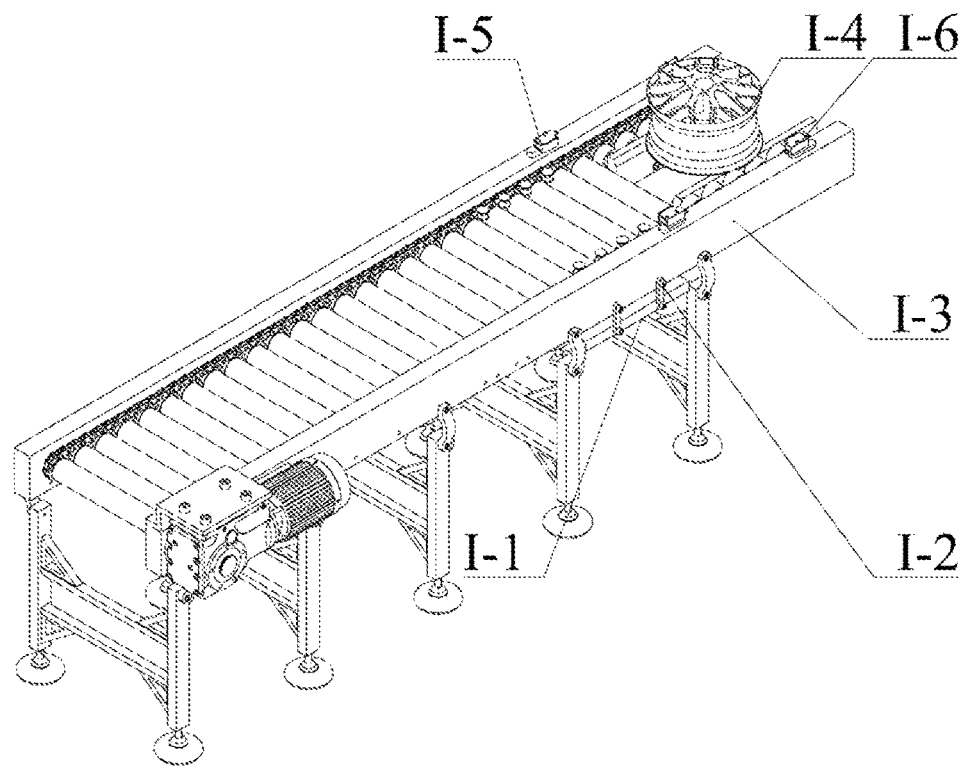
FIG. 3 is an axonometric view of a roller table assembly.
Figure 4:
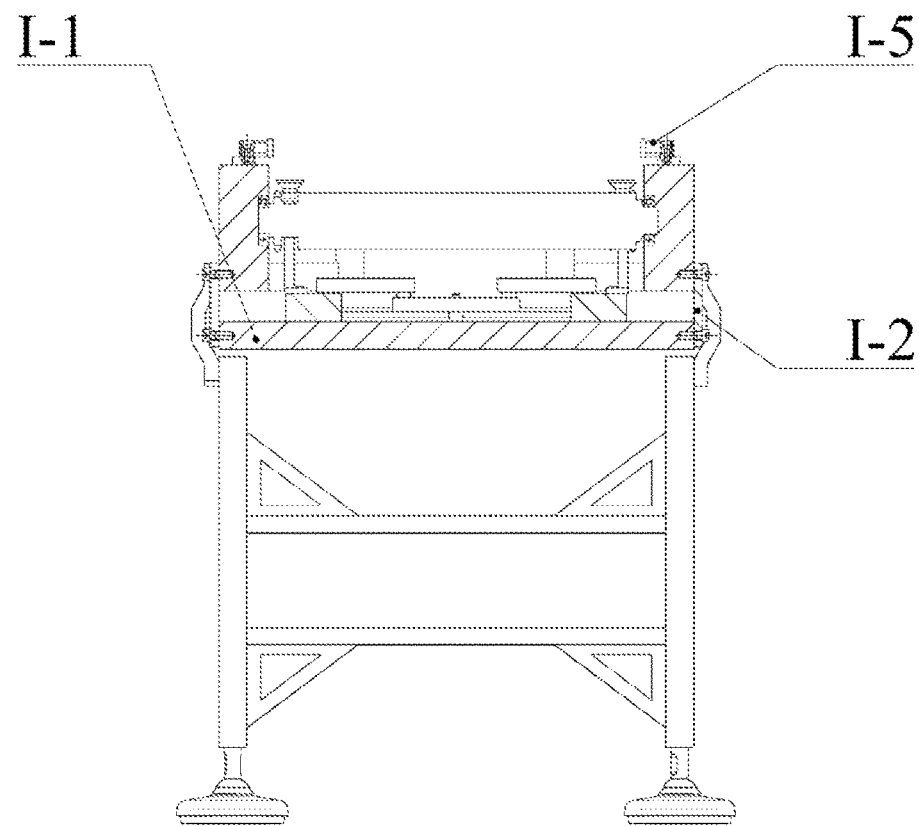
FIG. 4 is a sectional view showing the installation of the roller table assembly.

As shown in FIGS. 3 and 4, the roller table assembly I comprises a wheel hub centring positioning device I-1, a roller table I-3, an opposite-type photoelectric sensor I-5 and an opposite-type photoelectric sensor I-6; the roller table I-3 adopts a pass-through roller table. The opposite-type photoelectric sensor I-5 and the opposite-type photoelectric sensor I-6 are mounted on roller table supporting brackets at a beginning and an end of a window of the roller table respectively; the wheel hub centring positioning device I-1 is mounted below a roller at a left end of the opposite-type photoelectric sensor I-5, and a bracket I-1-2 of the wheel hub centring positioning device I-1 passes through a gap between rollers. The wheel hub centring positioning device I-1 is connected to the roller table supporting bracket through a flange seat I-2.

Specifically, when the wheel hub I-4 is transmitted to a position of the opposite-type photoelectric sensor I-5 on the roller table I-3, the opposite-type photoelectric sensor I-5 sends an information to a computer, and the computer sends information to a pneumatic circuit thus making the wheel hub centring positioning device I-1 start to work, making the wheel hub I-4 in a middle position of the roller table I-3, thus preventing the wheel hub I-4 from falling off when it passes through the window of the roller table I-3. When the wheel hub I-4 reaches a position of the opposite-type photoelectric sensor I-6 at the end of the roller table I-3, the opposite-type photoelectric sensor I-6 sends the information to the computer, and the computer receives the information and sends a stop instruction to a steering gear motor and a material picking-up information to the wheel hub scanning platform IV. After the wheel hub I-4 is picked up, the opposite-type photoelectric sensor I-6 sends the information to the computer, and the computer sends a running instruction to the steering gear motor, and the roller table assembly I starts a new working cycle.

Figure 5:
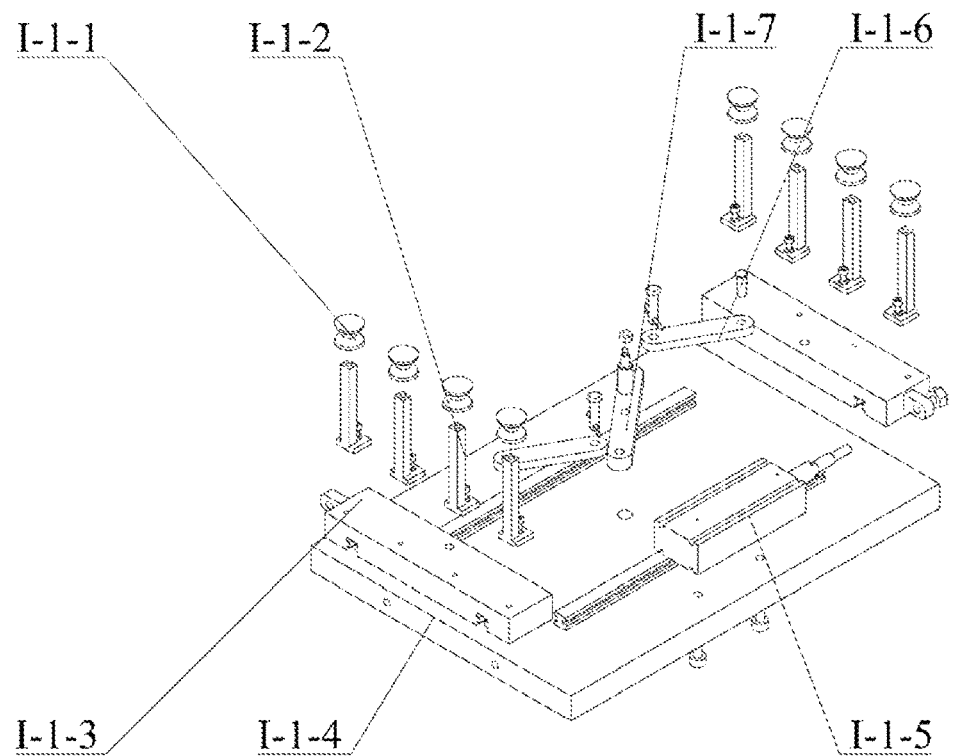
FIG. 5 is an exploded view of a wheel hub centring positioning device.
Figure 6:
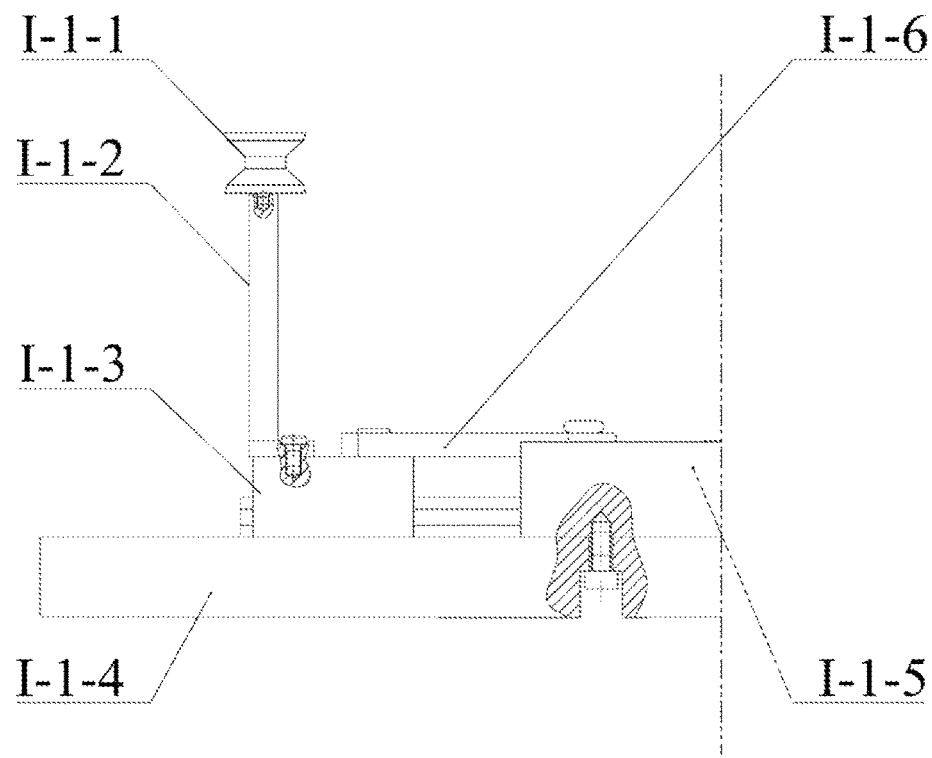
FIG. 6 is a partial sectional view showing the installation of the wheel hub centring positioning device.

As shown in FIGS. 5 and 6, the wheel hub centring positioning device I-1 comprises a V-shaped wheel with screw I-1-1, a bracket I-1-2, a sliding table I-1-3, a base I-1-4, an air cylinder I-1-5, a connecting rod I-1-6, a connecting rod I-1-7.

Two the sliding tables I-1-3 are mounted on a guide rail I-1-4-2 of the base I-1-4, the air cylinder I-1-5 is fixedly connected with the base I-1-4, a piston rod of the air cylinder I-1-5 is fixedly connected with one the sliding table I-1-3. A center hole of the connecting rod I-1-7 is hinged with a center hole of the base I-1-4, a first end of the connecting rod I-1-6 is hinged with the sliding table I-1-3, and a second end of the connecting rod I-1-6 is hinged with the connecting rod I-1-7. The connecting rod I-1-7, the connecting rod I-1-9 and the sliding table I-1-3 together form a crank sliding block mechanism. The bracket I-1-2 is fixedly connected with the sliding table I-1-3. The V-shaped wheel with screw I-1-1 is fixedly connected with the bracket I-1-2.

Specifically, after the wheel hub centring positioning device I-1 receives an operation instruction sent by the computer, the piston rod of the air cylinder I-1-5 retracts, and through the crank sliding block mechanism, the sliding tables I-1-3 at both ends of the mechanism move in opposite directions along the guide rails, and the V-type wheel with screw I-1-1 contacts a wheel rim of the wheel hub I-4 and pushes the wheel hub I-4 toward a middle position. After one the positioning is completed, the device is reset to prepare for the next positioning.

Figure 7:
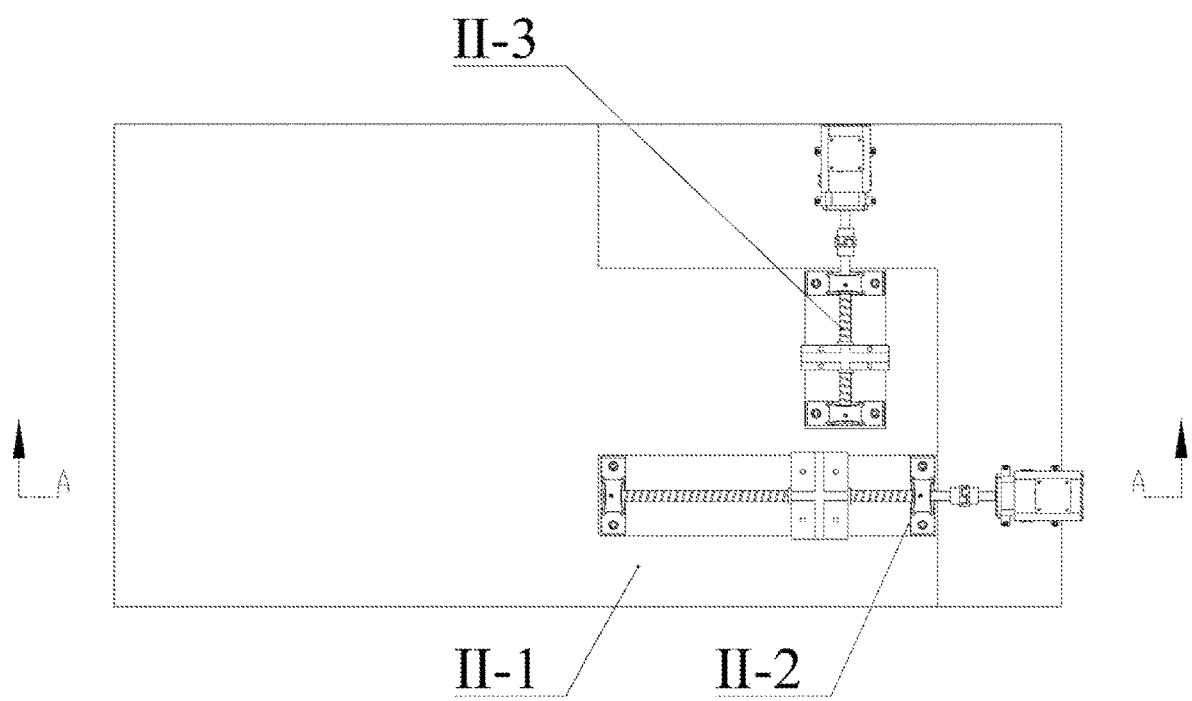
FIG. 7 is an upper view of a displacement control module.
Figure 8:
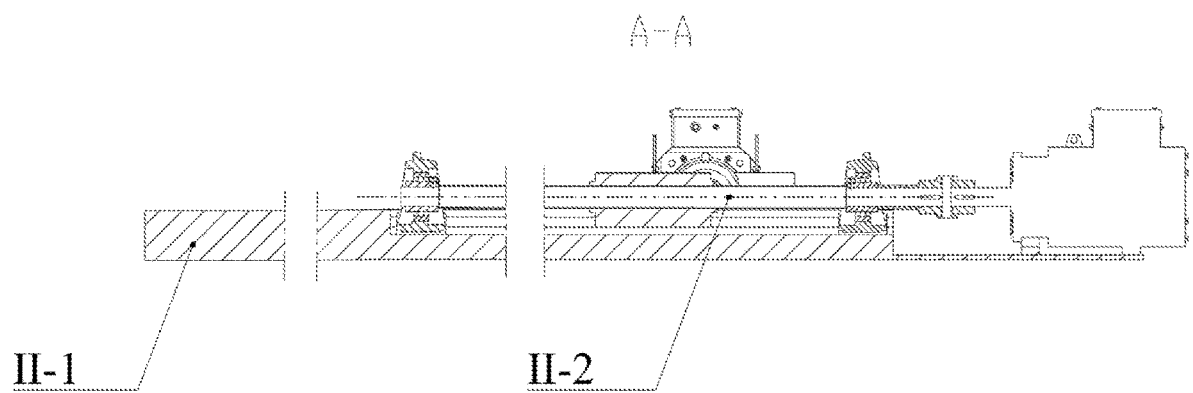
FIG. 8 is a A-A sectional view of the displacement control module.

As shown in FIGS. 7 and 8, the displacement control module II comprises a base plate II-1, a first ball screw assembly II-2, and a second ball screw assembly II-3. The base plate II-1 has two long slots for mounting the first ball screw assembly body II-2 and the second ball screw assembly body II-3. The first ball screw assembly body II-2 mounted in the long slot along the X-axis direction is used to control the movement of the wheel hub scanning platform IV, and the second balls crew assembly body II-3 mounted in the long slot along the Y-axis direction is used to control the movement of the 3D scanning device III.

Figure 9:
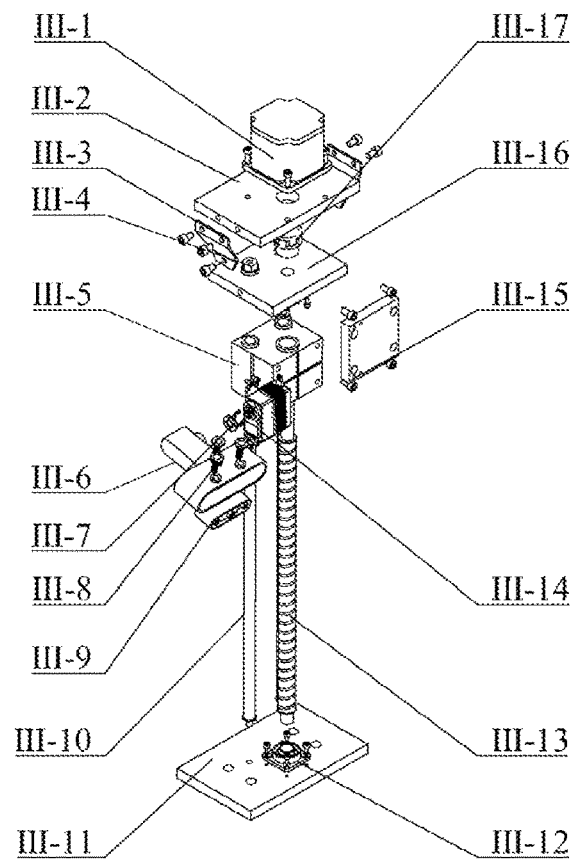
FIG. 9 is an exploded view of a wheel hub 3D scanning device.
Figure 10:
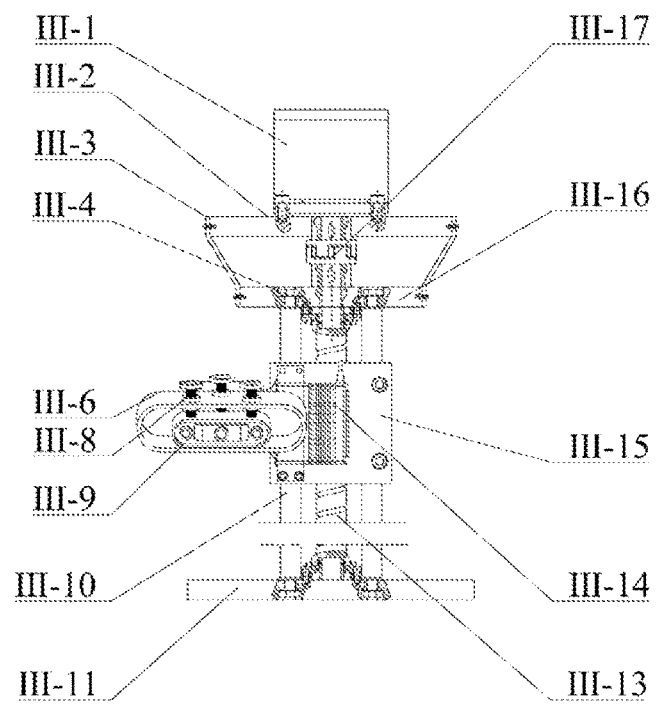
FIG. 10 is a partial sectional view showing the installation of the wheel hub 3D scanning device.

As shown in FIGS. 9 and 10, the 3D scanning device III comprises a motor III-1, a motor supporting base III-2, a ball screw upper mounting seating seat III-16, a sliding table III-5, a 3D scanner mounting bracket III-6, a 3D scanner III-9, a steering gear III-14, a guide bar III-10, a ball screw III-13, an outer spherical ball bearing with seat III-12, ball screw lower mounting seating seat III-11, and a working table III-15.

The motor mounting seat III-1 is connected to the motor supporting base III-2; the ball screw upper mounting seat III-16 is connected to the motor supporting base III-2 through a flange III-3; the flange III-3 is fixedly connected to the ball screw upper mounting seat III-16. An extended end of the guide rod III-10 is machined with external screw threads, and passes through a countersunk hole of the ball screw upper mounting seat III-16 and a countersunk hole of the ball screw lower mounting seat III-11, and is connected with a hexagonal flange face nut III-4 by threaded, which is for an axial fixing. The outer spherical ball bearing with seat III-12 is mounted on the ball screw upper mounting seat III-16 and the ball screw lower mounting seat III-11.

An upper end of the ball screw III-13 passes through a through-hole on the ball screw upper mounting seat III-16 and is connected, together with a shaft of the motor III-1, to the coupling III-17. The sliding table III-5 is mounted on the guide bar III-10 and the ball screw III-13. The working table III-15 is fixedly connected to the sliding table III-5. The steering gear mounting seat III-14 is fixedly connected to the working table III-15. A steering gear arm III-7 is mounted on a shaft of the steering gear III-14. The steering gear arm III-7 is fixedly connected to the 3D scanner mounting bracket III-6. The 3D scanner III-9 is mounted in the 3D scanner mounting bracket III-6, and the 3D scanner mounting bracket III-6 is provided with threaded holes to fix the 3D scanner by screws III-8.

Specifically, the 3D scanning device III is mounted on the second ball screw assembly II-3, and there can realize a movement of the 3D scanning device III along the Y-axis through the second ball screw assembly II-3, which in turn realize a movement of the 3D scanner III-9 along the Y-axis. A sliding of the sliding table III-5 on the 3D scanning device III along the ball screw III-13 and the guide bar III-10 can realize a movement of the 3D scanner III-9 along the Z-axis, and there can realize a rotation of certain angle of the 3D scanner III-9 through the steering gear III-14. Thus, the 3D scanner III-9 can realize the movement of X-, Y-, and Z-axis in a certain space and can also realize the rotation with the certain angle, so as to automatically adjust a focal distance between the 3D scanner III-9 and the wheel hub I-4, so that the obtained 3D scanning data can be clearer.

Figure 11:
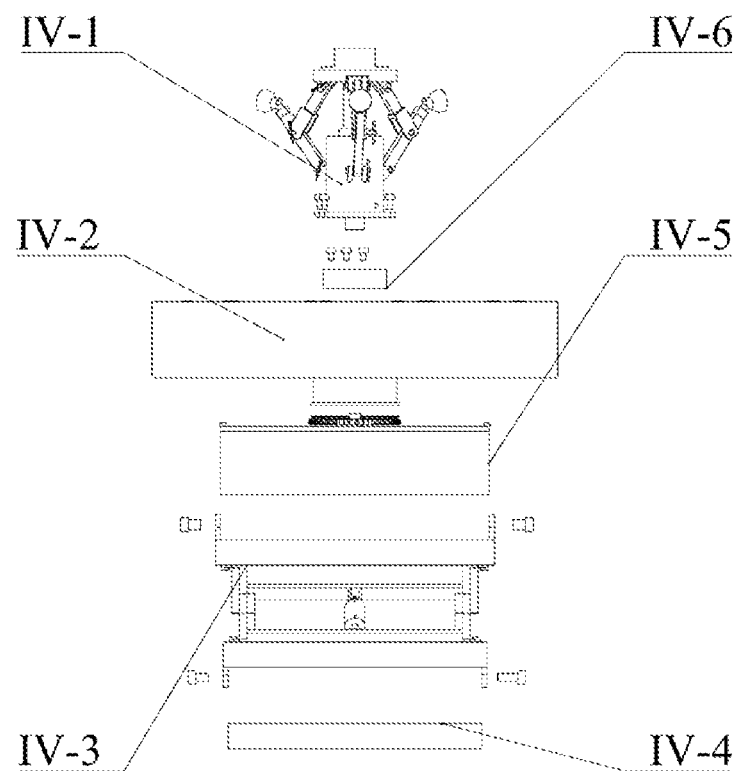
FIG. 11 is an exploded view of a wheel hub scanning platform.
Figure 12:
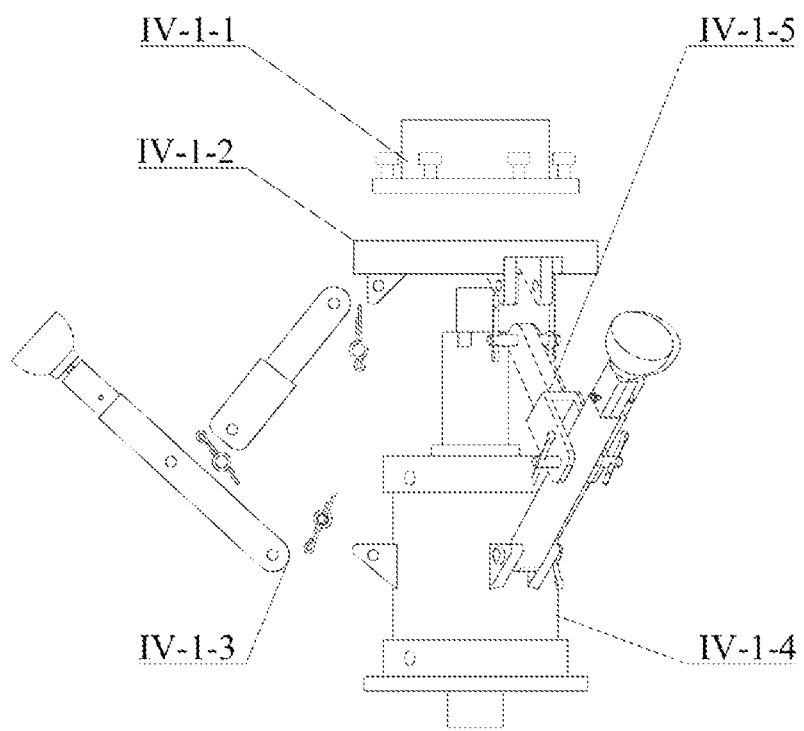
FIG. 12 is an exploded view of a wheel hub clamping device.
Figure 13:
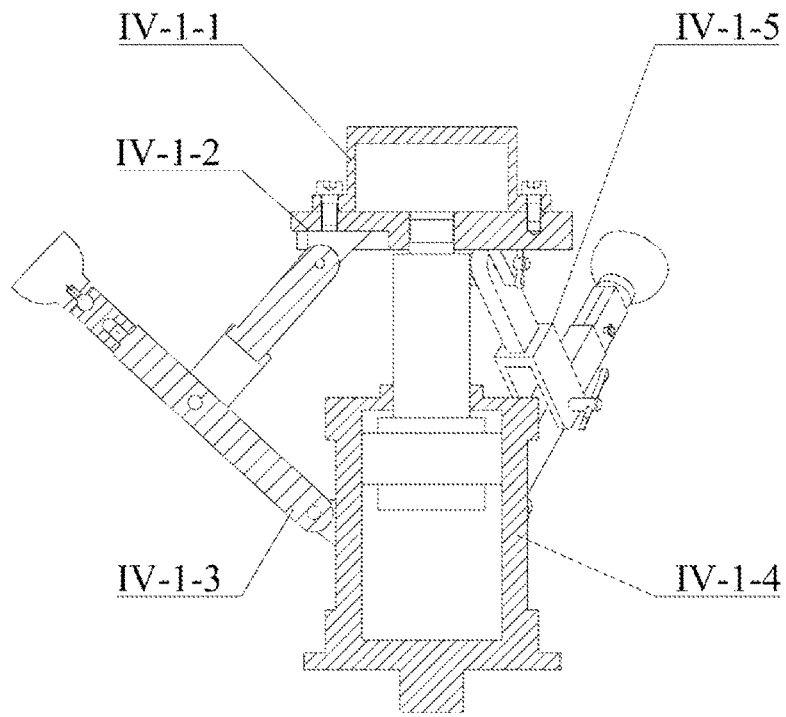
FIG. 13 is a sectional view showing the installation of the wheel hub clamping device.
Figure 14:
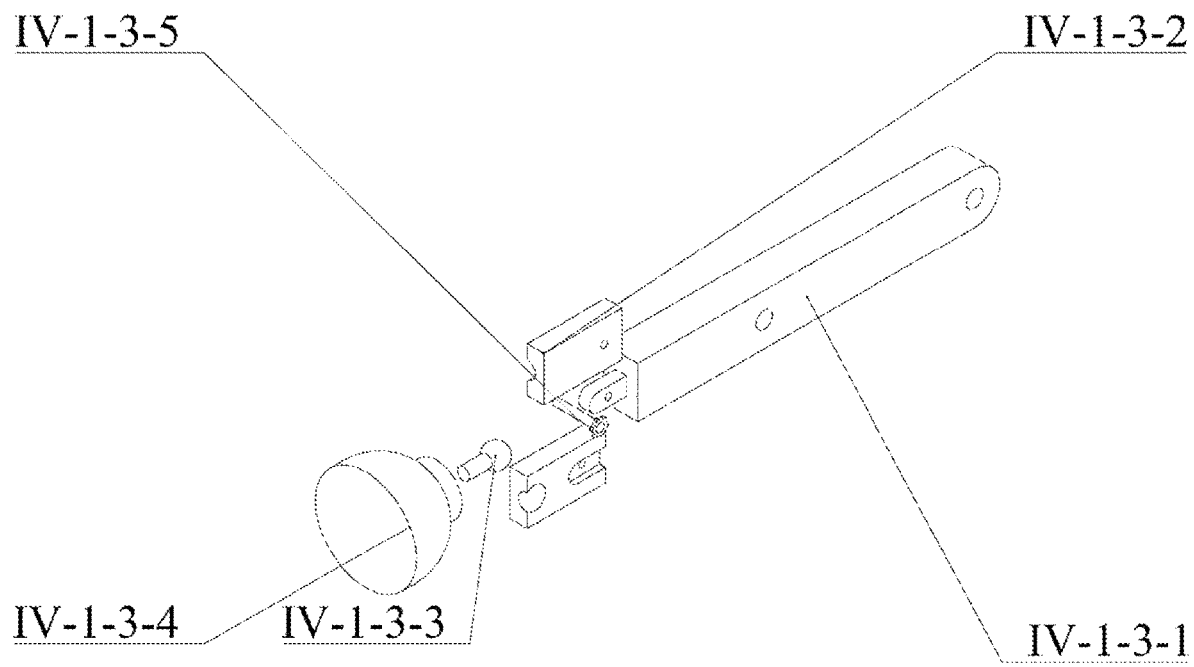
FIG. 14 is an exploded view of a clamping jaw of the wheel hub clamping device.
Figure 15:
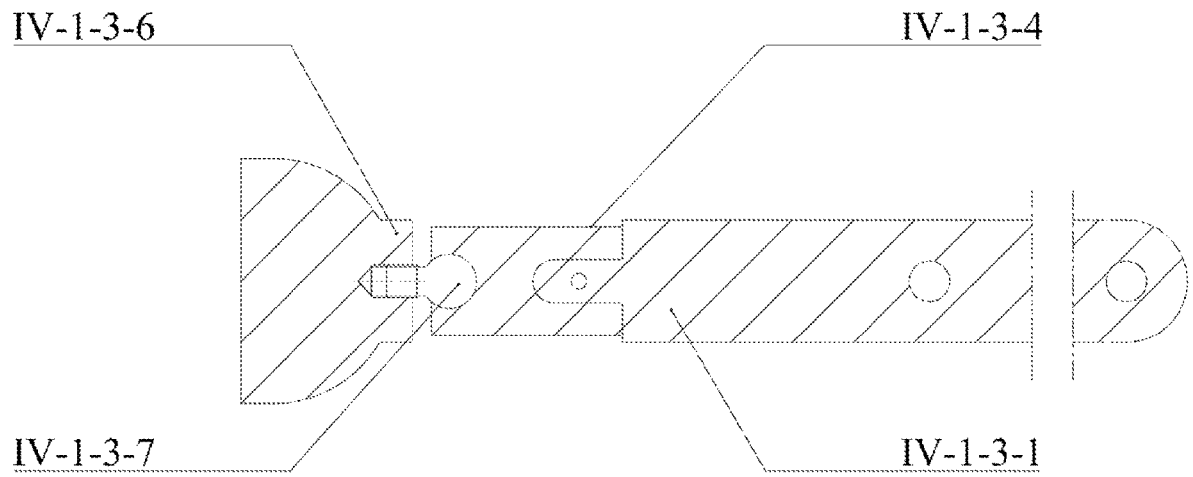
FIG. 15 is a sectional view showing the installation of the clamping jaw of the wheel hub clamping device.
Figure 16:
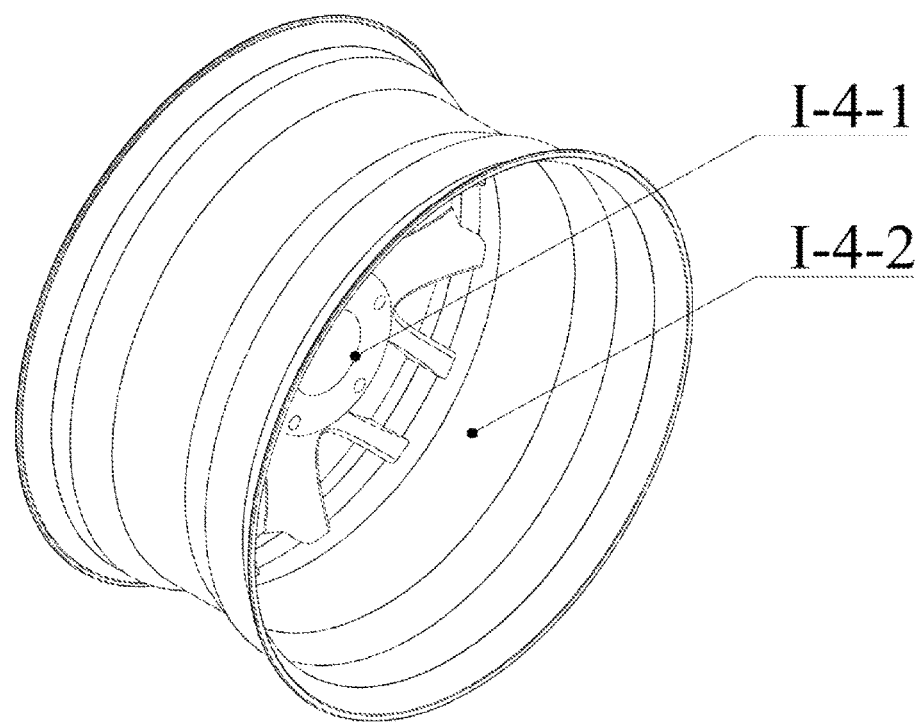
FIG. 16 is an axonometric view of a wheel hub.

As shown in FIG. 11, the wheel hub scanning platform IV comprises a wheel hub clamping device IV-1, a turntable IV-2, a lifting platform IV-3, a working table IV-4, a transmission assembly IV-5, and a spoke weighing sensor IV-6. The lifting platform IV-3 is mounted on the working table IV-4, the transmission assembly IV-5 is mounted on the lifting platform IV-3, an outer gear slewing bearing IV-5-12 is mounted on the transmission assembly IV-5, the turntable IV-2 is mounted on the outer gear slewing bearing IV-5-12, the spoke weighing sensor IV-6 is provided inside the turntable IV-2, the wheel hub clamping device IV-1 is embedded in the turntable IV-2 and connected with the spoke weighing sensor IV-6.

Specifically, the wheel hub clamping device IV-1 being responsible for taking off the wheel hub I-4 from the roller table I-3 and clamping the wheel hub I-4. The turntable IV-2 makes the wheel hub I-4 and the wheel hub clamping device IV-1 rotate, so that the 3D scanner III-9 can scan all outer surfaces of the wheel hub I-4 completely. The lifting platform IV-3 controls a lifting of the whole device and provides a condition of height for wheel hub clamping device IV-1 taking off the wheel hub I-4 from the roller table I-3. The transmission assembly IV-5 drives the rotation of the turntable IV-2. The working able IV-4 through which the wheel scanning platform IV is connected to the sliding table II-2-3.

As shown in FIGS. 12, 13, 14 and 15, the wheel hub clamping device IV-1 comprises a supporting block IV-1-1, a mounting plate IV-1-2, an inner brace claw assembly IV-1-3, an air cylinder IV-1-4, and a connecting rod IV-1-5. The supporting block IV-1-1 is fixedly connected with the mounting plate IV-1-2, and an upper surface of the supporting block IV-1-1 needs to be finely machined to obtain a high surface accuracy. A center of the mounting plate IV-1-2 is provided with a threaded hole and three mounting seats are provided along a circumference thereof, and the connecting rod IV-1-5 is hinged with the mounting seats of the mounting plate IV-1-2, and the connecting rod IV-1-5 is hinged with a connecting rod IV-1-3-1 of the inner brace claw assembly IV-1-3. An extended end of a piston rod IV-1-4-1 is machined with external screw threads, and a bottom of the air cylinder IV-1-4 is welded with a threaded rod. The extended end of the piston rod of the air cylinder IV-1-4 is fixedly connected to the threaded hole of the center of the mounting plate. A connecting rod IV-1-3-1 of the inner brace claw assembly IV-1-3 is hinged to the air cylinder body.

The inner brace claw assembly IV-1-3 comprises a connecting rod IV-1-3-1, a mounting block IV-1-3-2, a hemispherical head IV-1-3-4, and a ball head IV-1-3-3. A threaded rod welded on the ball head IV-1-3-3 is fixedly connected to a threaded hole on the hemispherical head IV-1-3-4. A ball head portion of the ball head IV-1-3-3 is mounted in a ball groove of the mounting block IV-1-3-2. An extended end of the connecting rod IV-1-3-1 is mounted in a rod groove of the mounting block IV-1-3-2, and the connecting rod IV-1-3-1 is fixedly connected to the mounting block IV-1-3-2 by the screw IV-1-3-5. At this time, the hemisphere head IV-1-3-4 can make a certain angle of rotation in space, so as to realize an adaptation to the wheel hubs I-4 of different sizes.

Specifically, when the piston rod extends upward, the mounting plate IV-1-2 drives the connecting rod IV-1-5 to drive the inner brace claw assembly IV-1-3 to rotate clockwise, and the supporting block IV-1-1 holds an end surface of center circle of inner spoke of the wheel hub I-4-1 to lift the wheel hub I-4; when the piston rod retracts downward, the mounting plate IV-1-2 drives the connecting rod IV-1-5 to drive the inner brace claw assembly IV-1-3 to rotate counterclockwise. When the hemispherical head IV-1-3-4 of the inner brace claw assembly IV-1-3 is in contact with a surface of inner circle I-4-2 of the wheel hub I-4, and when the force applied to the wheel hub clamping device IV-1 by the wheel hub I-4 and the force applied to the wheel hub I-4 by the wheel hub clamping device IV-1 reach a balance, the wheel hub I-4 is in a clamping state. Obviously, the hub clamping device IV-1 adopts an internal support clamping method, which can clamp the wheel hub I-4 from inside the wheel hub I-4, and whole the wheel hub clamping device IV-1 is completely placed inside the wheel hub I-4, thus greatly reducing the interference to the 3D scanning of the wheel hub.

Figure 17:
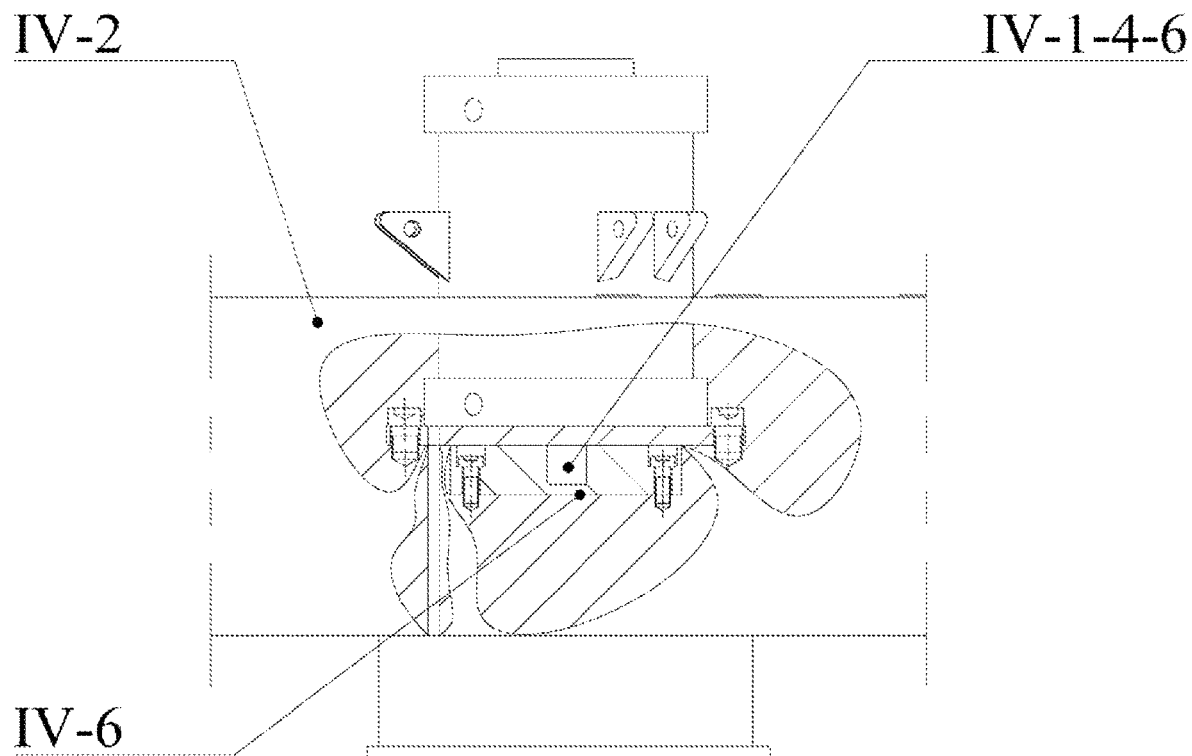
FIG. 17 is a sectional view showing the installation of the wheel hub, an air cylinder and a spoke weighing sensor.

As shown in FIG. 17, a square slot is provided in a center of the turntable IV-2 for mounting the wheel hub clamping device IV-1, and a circular inner slot is provided in the square slot for mounting the spoke weighing sensor IV-6. A threaded hole IV-2-3 in the circular inner slot of the turntable IV-2 is fixedly connected to a threaded hole in the spoke weighing sensor IV-6, and the spoke weighing sensor IV-6 is connected to the computer. A threaded rod at the bottom of the air cylinder IV-1-4 is connected to a center hole of the spoke weighing sensor IV-6 by threads, and the turntable IV-2 is connected to the air cylinder IV-1-4 by screws, the screws cannot be tightened to prevent the spoke weighing sensor IV-6 from detecting the change of gravity.

It should be noted that: a color of the turntable IV-2 is black as a whole, which can reduce the interference of external factors during the scanning process. Marking dots are labeled on the turntable IV-2, and are arranged randomly and in bright colors. A gas circuit channel provided in the square slot of the turntable IV-2 is connected to an air hole on the air cylinder through a pipe. The spoke weighing sensor IV-6 is connected to the computer.

Specifically, when the wheel hub clamping device IV-1 lifts the wheel hub I-4 from the roller table I-3, the spoke weighing sensor IV-6 detects a signal and transmits the signal to the computer, which processes the signal and sends another signal to the displacement control module II, which receives the signal and transports the wheel hub scanning platform IV to a front of the 3D scanner III-9 to tighten the wheel hub I-4, then the 3D scanning is performed.

Figure 18:
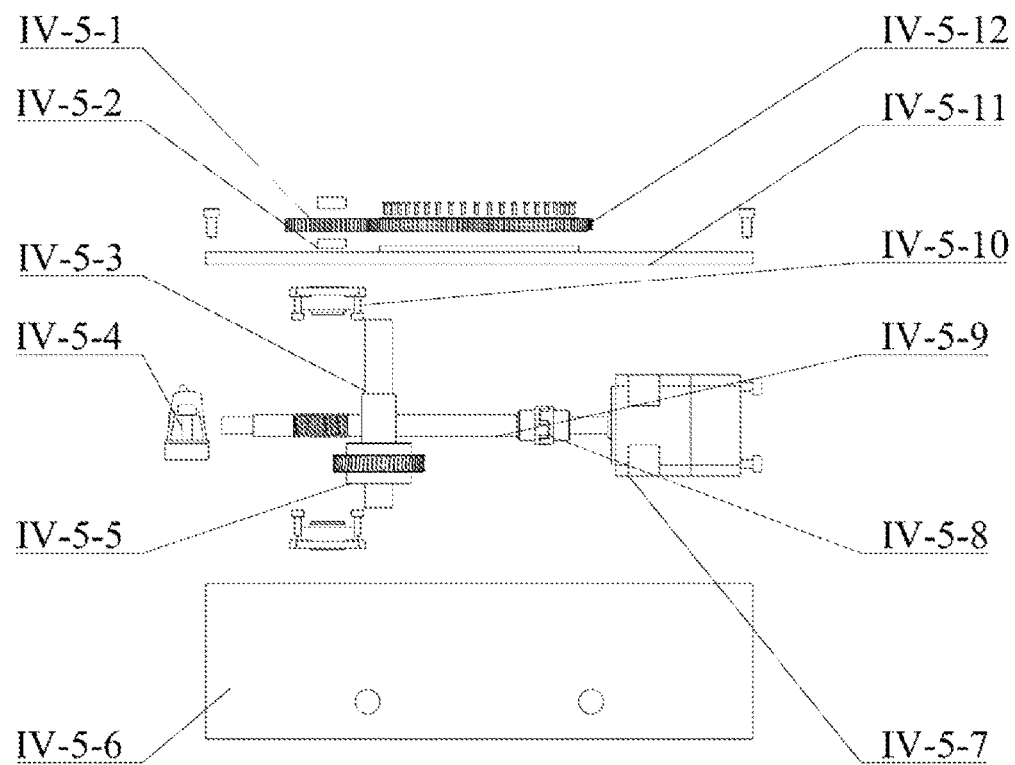
FIG. 18 is an exploded view of a transmission assembly.
Figure 19:
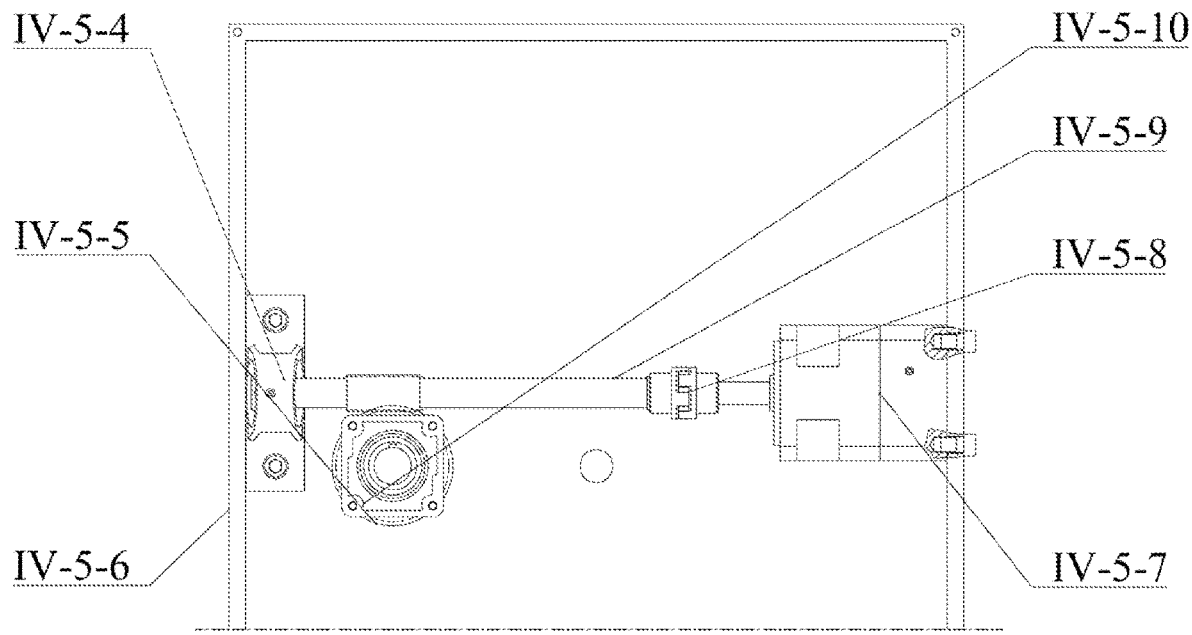
FIG. 19 is an upper view showing the mounting position of worm gear.

As shown in FIGS. 18 and 19, the transmission assembly IV-5 comprises a gear IV-5-1, an external gear type slewing bearing IV-5-12, a motor case cover IV-5-11, an outer spherical ball bearing with seat IV-5-10, an outer spherical ball bearing with seat IV-5-4, a worm shaft IV-5-9, a worm gear IV-5-5, a motor IV-5-7, and a motor case IV-5-6. The gear IV-5-1 and the outer gear slewing bearing IV-5-12 are intermeshed and mounted on the motor case cover IV-5-11. The motor IV-5-7, the worm gear IV-5-5, the worm shaft IV-5-9, the outer spherical ball bearing IV-5-4, the outer spherical ball bearing with seat IV-5-10 are mounted inside the motor case IV-5-6, and the worm gear and the worm shaft are intermeshed.

Specifically, a rotation of a spindle of the motor IV-5-7 is driven to the gear IV-5-1 through the deceleration of the worm gear IV-5-5 and the worm shaft IV-5-9, and the gear IV-5-1 drives the outer gear slewing bearing IV-5-12 to rotate, so that the outer gear slewing bearing IV-5-12 drives the turntable IV-2 to rotate.

Figure 20:
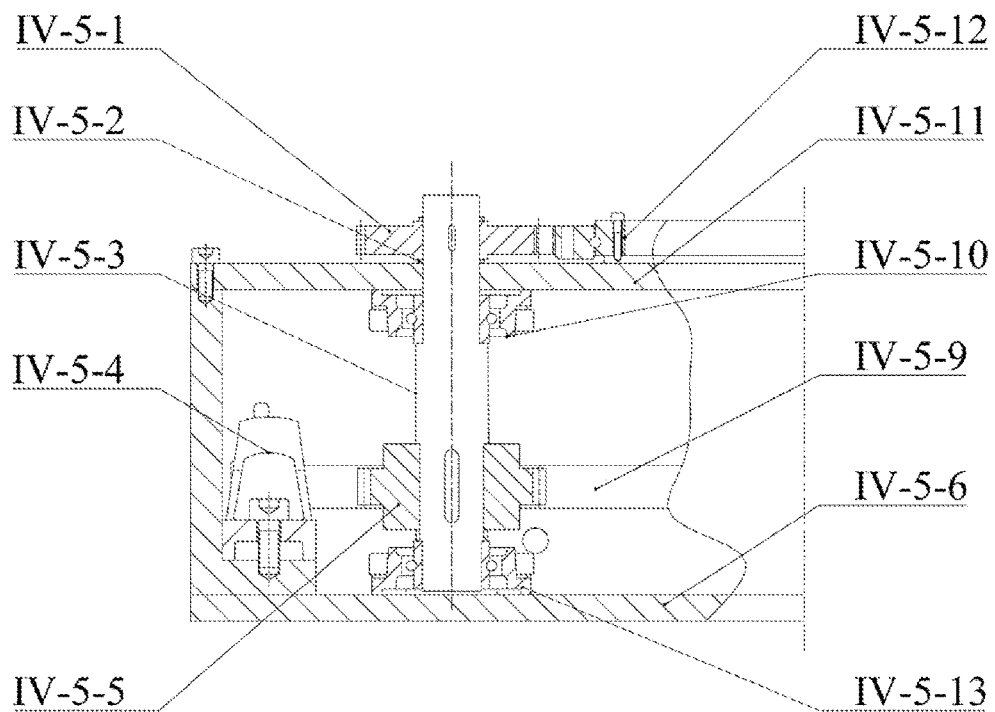
FIG. 20 is a sectional view showing the installation of the worm shaft.

As shown in FIG. 20, a through hole on the inner ring of outer gear slewing bearing IV-5-12 is fixedly connected with the motor case cover IV-5-11. The outer spherical ball bearing with seat IV-5-10 is fixedly connected with the motor case cover IV-5-11, and the outer spherical ball bearing with seat IV-5-13 is fixedly connected with the motor case IV-5-6. The transmission shaft is mounted in cooperation with the outer spherical ball bearings with seat IV-5-10 and IV-5-13. An installation of the worm gear IV-5-5 and the transmission shaft IV-5-3 adopts a shaft shoulder for axial positioning, a shaft sleeve for axial fixation, and a round head key for transmitting torque. An upper end of the transmission shaft IV-5-3 passes through a through-hole on the motor case cover IV-5-11 to cooperate with the gear IV-5-1. An installation of the gear IV-5-1 and the transmission shaft IV-5-3 adopts the shaft sleeve iv-5-2 for axial positioning, and a retaining ring for axial fixation. During the installation of the gear IV-5-1, it should be ensured that the gear IV-5-1 is meshed with the outer gear slewing bearing IV-5-12. The worm shaft IV-5-9 is mounted and matched with the outer spherical ball bearing with seat IV-5-4. During the installation, it should be ensured that the worm shaft IV-5-9 is meshed with the worm gear IV-5-5. The worm shaft is connected with a shaft of the motor IV-5-7 through a coupling. A mounting base of the motor IV-5-7 is fixedly connected with the motor case IV-5-6. The motor case cover IV-5-11 is fixedly connected with the body of the motor case IV-5-6. So far, the motor IV-5-7, the worm gear IV-5-5, the worm shaft IV-5-9, the outer spherical ball bearing with seat IV-5-4, the outer spherical ball bearing with seat IV-5-10, the outer spherical ball bearing with seat IV-5-13, the outer gear slewing bearing IV-5-12 and the coupling IV-5-8 are completely encapsulated in the motor case IV-5-6, which can effectively prevent dust and other impurities from affecting the operation of precision parts, and make the parts form a whole which can be mounted on the lifting platform IV-3.

Figure 21:
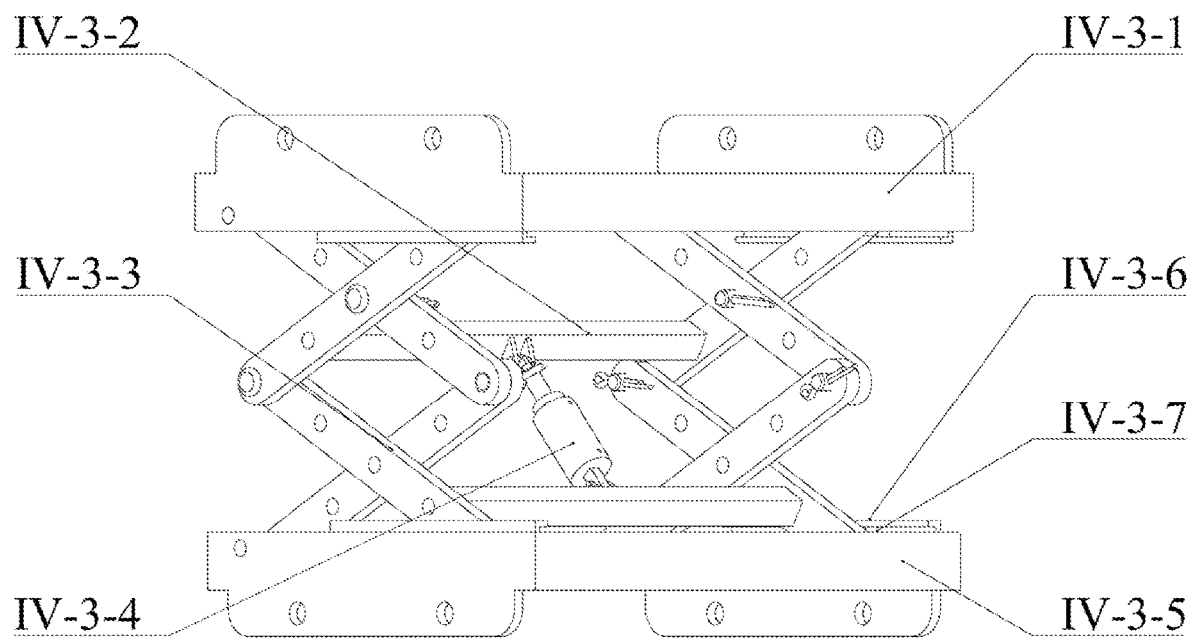
FIG. 21 is an axonometric view of a lifting platform.
Figure 22:
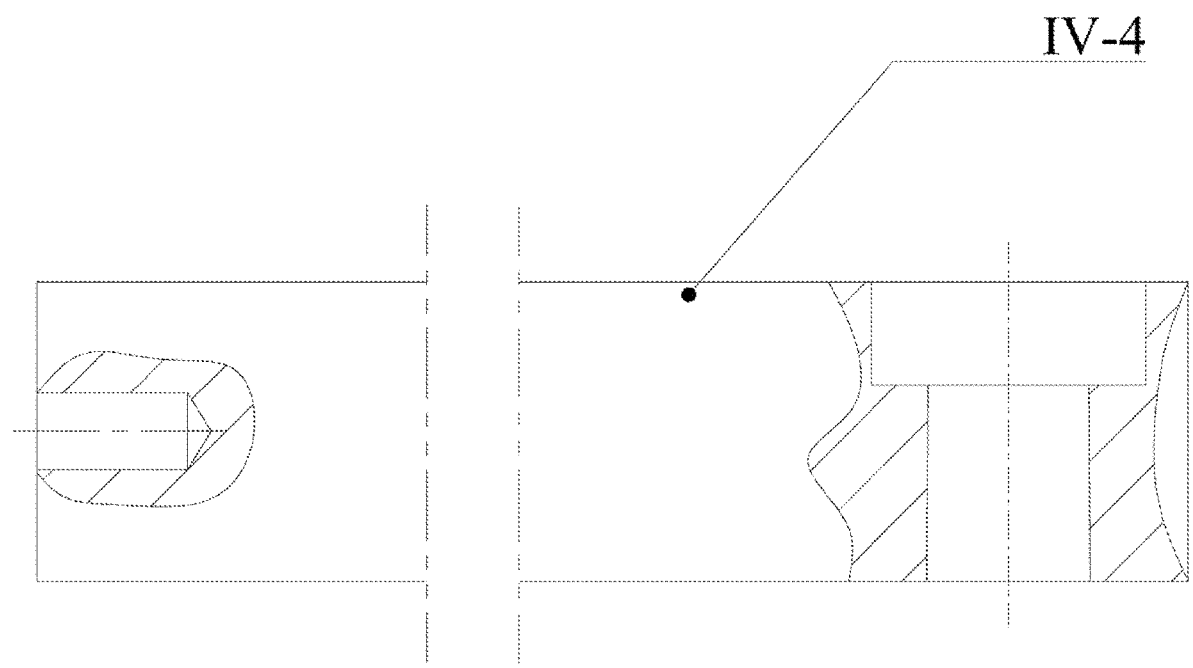
FIG. 22 is a sectional view of a structure of a working table of the transmission assembly.

As shown in FIGS. 21 and 22, the lifting platform IV-3 comprises a bearing seat IV-3-1, a supporting rod IV-3-2, a connecting rod IV-3-3, an air cylinder IV-3-4, a guide rail IV-3-6, a sliding block IV-3-7 and a mounting seat IV-3-5. The guide rail IV-3-6 is mounted on the bearing seat IV-3-1 and the mounting seat IV-3-5, and the sliding block IV-3-7 is mounted on the guide rail IV-3-6, which can slide along a straight line of the guide rail IV-3-6. A hinged part of the connecting rod IV-3-3 is connected with pin shaft and fixed with cotter pin. An installation of the supporting rod is to realize a synchronous movement of the connecting rod IV-3-3 on both sides and the sliding block IV-3-7. The air cylinder IV-3-4 is mounted on the supporting rod IV-3-2, and a lifting movement of the lifting platform can be controlled through the expansion and contraction of the piston rod. Through holes are provided on the bearing seat IV-3-1 and ear seats of the mounting seat IV-3-5 respectively, which can be used for the fixed connection between the bearing seat IV-3-1 and the transmission assembly IV-5 and between the mounting seat IV-3-5 and the working table IV-4.

Specifically, the wheel hub scanning platform IV is mounted on the first ball screw assembly II-2 on the displacement control module II and can move laterally along the x-axis direction. When the wheel hub I-4 is in place on the roller table I-3, the opposite-type photoelectric sensor I-6 transmits the signal to the computer. After analyzing the signal, the computer gives instructions to the first ball screw assembly II-2 on the displacement control module II, then the first ball screw assembly II-2 carries the wheel hub scanning platform IV to the position directly below the wheel hub I-4, the lifting platform IV-3 of the wheel hub scanning platform IV rises to the specified height, the piston rod of the air cylinder IV-1-4 in the wheel hub clamping device IV-1 extends to the specified position to push the wheel hub I-4 away from the roller table I-3, and the spoke weighing sensor IV-6 detects the gravity signal and transmits it to the computer; after analyzing the signal, the computer sends instructions to the first ball screw assembly II-2, then the first ball screw assembly II-2 carries the wheel hub scanning platform IV to a predetermined position, that is, directly in front of the 3D scanner III-9. The wheel hub clamping device IV-1 clamps the wheel hub I-4; the 3D scanner III-9 adjusts the appropriate scanning position according to the size of the wheel hub I-4. After the adjustment, the turntable IV-2 starts to rotate, the 3D scanner III-9 scans the wheel hub I-4 and constructs a model. According to the 3D model of blank of the wheel hub I-4, the computer automatically plans the machining path of the wheel hub I-4, and automatically compiles the machining program of the NC (numerical control) machine and imports it into the machine. When ready, the robot transports the wheel hub I-4 to a first machining machine. It should be noted that the computer plans the machining path for a certain type of the wheel hub I-4 and programs to obtain a corresponding machining program, the machining program will be automatically saved to the computer database, and if the model of a next the wheel hub (to be machined) is the same as the model of the planed wheel hub I-4, the saved machining program will be automatically used without reprogramming.

Figure 23:
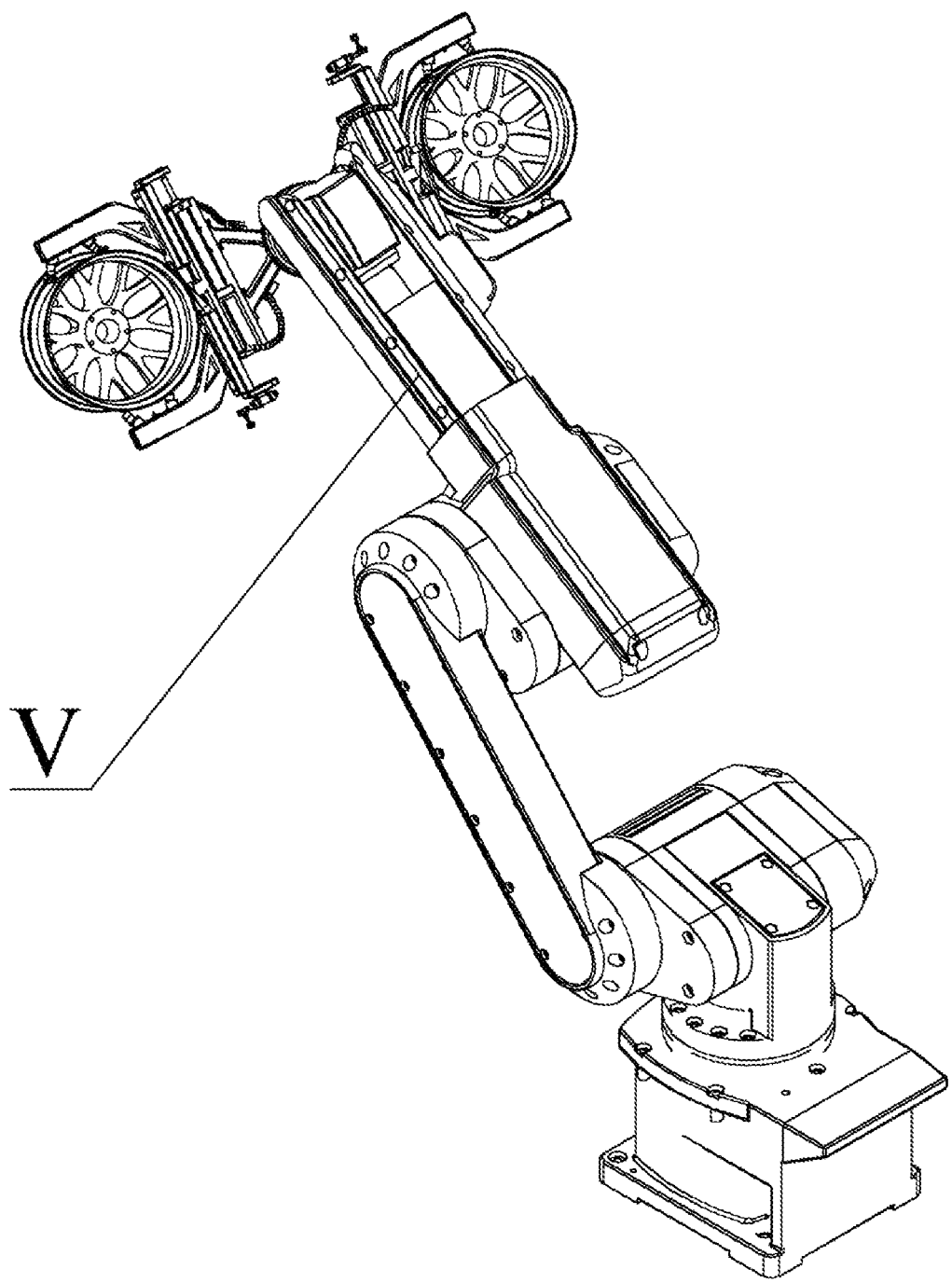
FIG. 23 is an axonometric view of a robot.

As shown in FIG. 23, the robot V adopts a manipulator with six degrees of freedom, and a clamping part of the robot V adopts a clamping mode of suction cup, which can be applicable to the wheel hubs of different sizes. A running track of the robot V is controlled by the computer, when the 3D scanning device III completes the scanning of the wheel hub I-4 and the corresponding processing path is automatically planed, the computer gives instructions to the robot V to clamp the wheel hub I-4 from the wheel hub clamping device IV-1. A clamping part of the robot V is provided with sensors, when the robot V clamps the wheel hub, the sensors transmit information to the computer; after analyzing the information, the computer gives the instructions to loosen the wheel hub I-4 to the wheel hub clamping device IV-1 on the 3D scanning device III, and the robot V removes the wheel hub I-4 from the wheel hub clamping device IV-1 and sends it to the first horizontal lathe for processing.

What is claimed is:

1. A full-automatic wheel hub 3D scanning system for intelligent production line of automotive wheel hubs, comprising:
    a base plate is provided with an X-directional displacement control device and a Y-directional displacement control device;
    a roller-table assembly is arranged on the base plate and comprises a roller table, wherein the roller table is provided with opposite-type photoelectric sensors and a wheel hub centering positioning device for centering positioning a wheel hub;
    a 3D scanning device, comprising a mounting bracket, wherein the bottom of the mounting bracket is controlled by the Y-directional displacement control device; a 3D scanner is mounted on the mounting bracket;
    a wheel hub scanning platform is arranged at an end of the roller-table assembly and is controlled by the X-directional displacement control device; and
    a robot is arranged on a first side of the wheel hub scanning platform, for conveying the wheel hub after 3D scanning.

2. The full-automatic wheel hub 3D scanning system as claimed in claim 1, wherein the 3D scanner is connected with a steering gear, and the steering gear is used for adjusting the elevation angle of the 3D scanner.

3. The full-automatic wheel hub 3D scanning system as claimed in claim 1, wherein the mounting bracket is also provided with a lifting mechanism, and the lifting mechanism is used for controlling a lifting of the 3D scanner.

4. The full-automatic wheel hub 3D scanning system as claimed in claim 1, wherein the wheel hub scanning platform comprises a lifting platform, a turntable is arranged on the lifting platform, a wheel clamping device and a sensor for detecting the presence of the wheel hub on the platform are arranged in the center of the turntable.

5. The full-automatic wheel hub 3D scanning system as claimed in claim 4, wherein the wheel hub clamping device comprises an air cylinder, a supporting block, a mounting plate, an inner brace claw assembly and a first connecting rod; the supporting block is mounted on the mounting plate, the mounting plate is connected with a piston rod of the air cylinder, a mounting seat is arranged on the mounting plate and is used for being connected with a first end of the first connecting rod, and a second end of the first connecting rod is connected with the inner brace claw assembly, and the inner brace claw assembly further is connected with a mounting seat on the air cylinder.

6. The full-automatic wheel hub 3D scanning system as claimed in claim 5, wherein the inner brace claw assembly comprises a second linkage, a mounting block, a ball head and a hemispherical head; wherein the second linkage is mounted in a rod groove of the mounting block, the ball head is mounted in a ball groove of the mounting block, and the ball head is connected with the hemispherical head by threads.

7. The full-automatic wheel hub 3D scanning system as claimed in claim 5, wherein the middle of the turntable is provided with a square slot for mounting the air cylinder of the wheel hub clamping device, the air cylinder is mounted in the square slot in an embedded manner; a circular inner slot is mounted in the square slot, a spoke weighing sensor is provided in the circular inner slot, the air cylinder is connected with the spoke weighing sensor.

8. The full-automatic wheel hub 3D scanning system as claimed in claim 1, wherein the wheel hub centering positioning device is mounted below rollers of the roller table and comprises an air cylinder, a crank sliding block mechanism and a bracket with V-shaped wheels; the air cylinder driving the bracket through the crank sliding block mechanism; the bracket passing through a gap of the rollers of the roller table.

\* \* \* \* \*